US010587674B1

(12) United States Patent
Hansen

(10) Patent No.: US 10,587,674 B1
(45) Date of Patent: Mar. 10, 2020

(54) SYSTEMS AND METHODS FOR CONTROLLING IN WHICH ORDER ELEMENTS OF A SET OF DISPLAYABLE CONTENT ARE TRANSFERRED VIA AN ONLINE CONNECTION

(71) Applicant: Katomy Holdings LLC, San Diego, CA (US)

(72) Inventor: Shannon Hansen, San Diego, CA (US)

(73) Assignee: Katomy Holdings LLC, San Diego, CA (US)

( * ) Notice: Subject to any disclaimer, the term of this patent is extended or adjusted under 35 U.S.C. 154(b) by 0 days.

(21) Appl. No.: 16/004,187

(22) Filed: Jun. 8, 2018

(51) Int. Cl.
*H04L 29/08* (2006.01)
*H04L 29/06* (2006.01)
*G06F 21/10* (2013.01)

(52) U.S. Cl.
CPC .......... *H04L 67/025* (2013.01); *H04L 67/322* (2013.01); *H04L 67/36* (2013.01); *H04L 67/42* (2013.01)

(58) Field of Classification Search
CPC ..... H04L 67/02; H04L 67/025; H04L 67/322; H04L 67/36; H04L 67/42
USPC .......................................................... 709/219
See application file for complete search history.

(56) References Cited

U.S. PATENT DOCUMENTS 5,826,031 A 10/1998 Nielsen
6,983,331 B1 * 1/2006 Mitchell ................ H04L 67/06 709/246
7,890,578 B2 2/2011 Cheng
8,635,537 B1 * 1/2014 Kan ....................... G06Q 20/32 715/745
2007/0078928 A1 * 4/2007 Yang ....................... H04L 67/06 709/203
2009/0013034 A1 * 1/2009 Cheng ..................... H04L 67/02 709/203
2014/0096014 A1 4/2014 Johnson
2015/0201001 A1 * 7/2015 Cabanillas ............ G06Q 50/01 709/203

OTHER PUBLICATIONS

Justin Johnson, "What is Lazy Loading", May 2017, stackpath.com, https://blog.stackpath.com/glossary-lazy-loading/ (Year: 2017).*
Tobin Titus et al., "Resource Priorities", Oct. 2014, W3C Working Group, https://www.w3.org/TR/resource-priorities/ (Year: 2014).*

* cited by examiner

*Primary Examiner* — Ruolei Zong
(74) *Attorney, Agent, or Firm* — Esplin & Associates, PC

(57) ABSTRACT

Systems and methods for controlling in which order elements of a set of displayable content are transferred via an online connection are disclosed. Exemplary implementations may receive a client-initiated request from a client computing platform for a webpage, and, responsive to receipt of the client-initiated request, transfer to the client computing platform a set of information that includes displayable content, a set of content locations, and executable content configured to be executed by the client computing platform. Execution of the executable content may include transmitting, from the client computing platform, one or more executable-initiated requests for one or more transfers of elements of displayable content to the client computing platform. An executable-initiated request may be initiated by the executable content. Upon completion of the requested transfers, the transferred elements are presented on the client computing platform.

21 Claims, 5 Drawing Sheets

SYSTEMS AND METHODS FOR CONTROLLING IN WHICH ORDER ELEMENTS OF A SET OF DISPLAYABLE CONTENT ARE TRANSFERRED VIA AN ONLINE CONNECTION

FIELD OF THE DISCLOSURE

The present disclosure relates to systems, methods, and storage media for controlling in which order elements of a set of displayable content are transferred via an online connection, e.g., from a server to a client computing platform. The set of displayable content may be usable to generate a presentation of a webpage on the client computing platform.

BACKGROUND

Client computing platforms such as personal client devices may connect to the internet and access information from network locations. For example, servers may host information that is retrieved from network locations. Client computing platforms may be configured to present information to users, e.g., through browser applications. Browser applications may present information on displays of client computing platforms. To some extent, browser applications may determine internally and/or autonomously in which order to retrieve and/or present different elements of the information.

SUMMARY

One aspect of the present disclosure relates to a system configured for controlling in which order elements of a set of displayable content are transferred via an online connection. The set of displayable content may be usable to generate a presentation of a webpage on a client computing platform. The client computing platform may include a browser application (also referred to as web browser, or browser software application). The browser application may be configured to present webpages on the client computing platform. In some implementations, browser applications may autonomously and/or in a predetermined manner control in which order elements of the set of displayable content are downloaded and/or otherwise transferred via an online connection. For example, in some cases the order may be based on placement in the source code, such as HTML code, of a webpage. This order may subsequently affect in which order the elements of the set of displayable content are displayed and/or otherwise presented.

In some implementations, and at some times, browser applications may not appear to be interactive and/or otherwise responsive to user input, e.g., due to being busy with downloading, rendering, displaying, presenting, code execution, and/or other tasks performed by the browser applications. The time from the moment a user selects a particular webpage until the moment the browser application becomes interactive for the user and/or otherwise becomes responsive to user input may be referred to as time-to-interactivity, or TTI. The time from the moment a user selects a particular webpage until the moment the browser application presents a particular type of content to the user (e.g., content of direct and/or primary interest to the user, i.e., content which the user intended to perceive when selecting the particular webpage) may be referred to as time to responsiveness. By controlling in which order elements of a set of displayable content are transferred via an online connection, the time-to-interactivity (and/or the time to responsiveness) may be reduced, and as a result the particular webpage may seem more responsive to user input. For example, if a particular webpage includes a combination of textual information of general interest to a visiting user and advertising, the time-to-interactivity may be reduced by presenting the textual information first, and adding and/or appending the advertising after the textual information has been presented by the browser application.

The system may include one or more hardware processors configured by machine-readable instructions. As used herein, hardware processors may be referred to as physical processors. The processor(s) may be configured to receive a client-initiated request from a client computing platform for a webpage. A client-initiated request may be initiated by a user of the client computing platform. For example, a client-initiated request may be initiated by entry and/or selection performed by the user, e.g., through a user interface.

A webpage may include a set of displayable content. As used herein, displayable content may include one or more of textual information, audio information, image information, video information, animated information, and/or other information capable of being displayed and/or otherwise presented to a user of a client computing platform. A set of displayable content may be usable to generate a presentation of the webpage on the client computing platform. A client-initiated request may be received at a network location corresponding to the webpage, such as a uniform resource locator (URL).

The processor(s) may be configured to transfer, responsive to receipt of a client-initiated request, a set of information to the client computing platform. A set of information may include a subset of the set of displayable content, one or more content locations, executable content, and/or other information. The set of displayable content may include one or more of a first subset, a second subset, a third subset, and/or other subsets of displayable content. The first subset of displayable content may be usable to generate the presentation of at least part of the webpage on the client computing platform.

The set of information may include a set of one or more content locations, e.g., an ordered set of one or more content locations. A set of content locations may include a first content location, a second content location, a third content location, and/or other content locations. Individual ones of the ordered set of content locations may identify locations of elements of the set of displayable content and/or locations of other information. Locations of displayable content may include network locations, filenames, file-paths, links, and/or other information that may be used to locate and/or otherwise retrieve an element of displayable content. A first content location may identify a first location of a first element of the set of displayable content. A second content location may identify a second location of a second element of the set of displayable content, and so forth.

The set of information may include executable content configured to be executed by the client computing platform. For example, executable content may include code, computer instructions, one or more scripts, and/or other executable content. In some implementations, the executable content may include JavaScript code. Executing the executable content may include transmitting, from the client computing platform, one or more executable-initiated requests for one or more transfers of elements of displayable content. An executable-initiated request may be initiated by the executable content and/or by other executable code. A first executable-initiated request may include a first content location. A second executable-initiated request may include a second content location, and so forth.

Executing the executable content may further include, responsive to receipt by the client computing platform of an element of displayable content, effectuation of the appending of one or more elements of displayable content to a set and/or subset of displayable content for presentation on the client computing platform to the user. In other words, the executable contents may effectuate that elements of displayable content are appended to and/or otherwise combined with other displayable content so that the combined content may be presented to the user. In some implementations, the executable content may operate in conjunction and/or jointly with a browser application. For example, a first element of displayable content may be appended to a first subset of displayable content. Executing the executable content may further include, subsequent to transmission by the client computing platform of a first executable-initiated request, transmitting a second executable-initiated request for a second transfer, to the client computing platform, of a second element of the displayable content. Executing the executable content may further include, responsive to receipt by the client computing platform of a second element of displayable content, effectuating appending the second element of displayable content to the first element of displayable content and/or to the subset of displayable content for presentation on the client computing platform to the user.

Another aspect of the present disclosure relates to a method for controlling in which order elements of a set of displayable content are transferred via an online connection. The method may include receiving a client-initiated request from a client computing platform for a webpage. The webpage may include the set of displayable content. The set of displayable content may be usable to generate a presentation of the webpage on the client computing platform. The client-initiated request may be received at a network location corresponding to the webpage. The client-initiated request may be initiated by a user of the client computing platform.

The method may further include, responsive to receipt of the client-initiated request, transferring to the client computing platform a set of information. A set of information may include a subset of the set of displayable content, one or more content locations, executable content, and/or other information. The set of displayable content may include one or more of a first subset, a second subset, a third subset, and/or other subsets of displayable content. The first subset of displayable content may be usable to generate the presentation of at least part of the webpage on the client computing platform.

U.S. Pat. No. 5,826,031 ("the '031 patent") appears to be relevant with regard to downloading the elements of a web page in a prioritized order. As described in the '031 patent, the default order that browser applications use to download elements can be flawed. The '031 patent refers to this as the response time problem. The '031 patent relies on priority attributes associated and embedded with the elements of a webpage. Additionally, the '031 patent relies on reordering the contents of a webpage in accordance with the priority attributes. The elements may be web objects such as, by way of non-limiting example, text, a graphical user interface element, an image file, an audio file, an applet, other computer code, a link, and/or other web objects. As described, a webpage may include one or more Hypertext Markup Language (HTML) files. This patent describes, in column 6, adding a "PRIORITY" attribute to each HTML tag for a web object, e.g., <IMG SRC=mypicture.gif PRIORITY=5>. Clearly, this requires a specially configured browser application (this is referred to as an "enhanced browser" in the '031 patent) for the client to interpret and use the PRIORITY attribute. Such a requirement is not relevant for the present disclosure, because default and/or standard browser applications are capable of executing the executable content/code, e.g., by virtue of built-in support for JavaScript code. Accordingly, the present disclosure does not require a specially configured or enhanced browser application to control in which order elements of a set of displayable content are transferred via an online connection.

U.S. Patent Application number 2014/0096014 ("the '014 application") appears to be relevant with regard to displaying different user interface (UI) elements, such as, by way of non-limiting example, buttons, tables menus, forms, and so on, in a particular order on a client device. As described in the '014 application, the order appears to be controlled by a specialized component in the client device, called "metadata requestor", that requests metadata from a server. By requesting, receiving, and using the metadata, client-side applications running on different types of platforms may be adapted to dynamically generate user interface features for different client devices. The use of metadata and/or the functionality of the metadata requestor are not relevant for the present disclosure, because default and/or standard browser applications are capable of executing executable content/code as claimed, e.g., by virtue of built-in support for JavaScript code. Accordingly, the present disclosure does not require a specialized component and/or otherwise enhanced client-side application in order to control in which order elements of a set of displayable content are transferred via an online connection.

U.S. Pat. No. 7,890,578 ("the '578 patent") appears to be relevant with regard to prioritizing different contents in a webpage, and transferring so-called controllers from the server to the client to do so. As described in the '578 patent, collaboration of both client-side and server-side is required (see background section). On the client-side, a particular application must be installed to act as the user's browser application. The '578 patent describes downloading a view controller that is configured to perform the display and rendering according to the view controller's logic, which effectively performs the functionality of a browser application (see column 4). In contrast, the present disclosure does not rely on information and/or executable content/code sent from the server to a client device to perform display and/or rendering of content, because those functions are performed by the default browser application on the client computing platform. Additionally, the '578 patent describes content-specific "demand helpers" that retrieve individual items of content upon activation, optionally through server-side logic that is referred to as dispatchers and delegates (see column 4 and 7). In contrast, the present disclosure does not rely, subsequent to the initial transfer of a set of information (this transfer being responsive to the initial request from the client-side), on communication of additional executable code from the server and/or interaction with additional executable code on the server. In other words, the claimed executable content/code operates autonomously on the client-side by transmitting requests for content (to the server). The use of downloaded controllers is not relevant for the present disclosure, because default and/or standard browser applications are capable of displaying and rendering content, as well as executing executable content/code as claimed, e.g., by virtue of built-in support for JavaScript code. This contrasts with the description of the '578 patent, in which logic included in the view controller is configured to display retrieved content on the client device. Accordingly, the present disclosure does not require installing a particular application, much less replacing functionality of a default browser application, in order to control in which order elements of a set of displayable content are transferred via an online connection.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
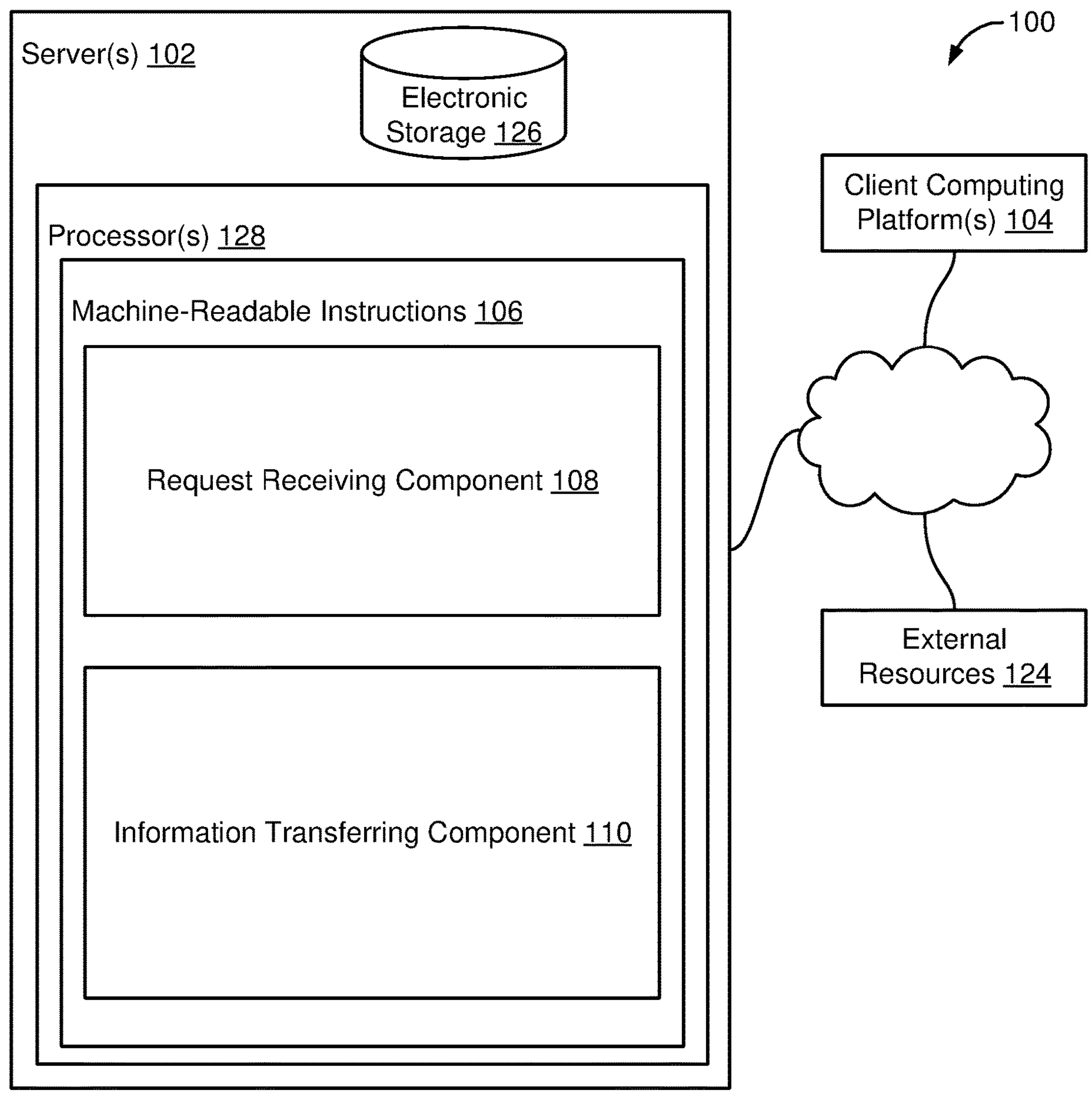
FIG. 1 illustrates a system configured for controlling in which order elements of a set of displayable content are transferred via an online connection, in accordance with one or more implementations.

FIG. 1 illustrates a system 100 configured for controlling in which order elements of a set of displayable content are transferred via an online connection, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, the online connection may be established using hypertext transfer protocol. The hypertext transfer protocol may include a protocol to transfer hypertext requests and information between servers and browsers, according to some implementations.

Server(s) 102 may be configured by machine-readable instructions 106. Machine-readable instructions 106 may include one or more instruction components. The instruction components may include computer program components. The instruction components may include one or more of a request receiving component 108, an information transferring component 110, and/or other instruction components.

Figure 5:
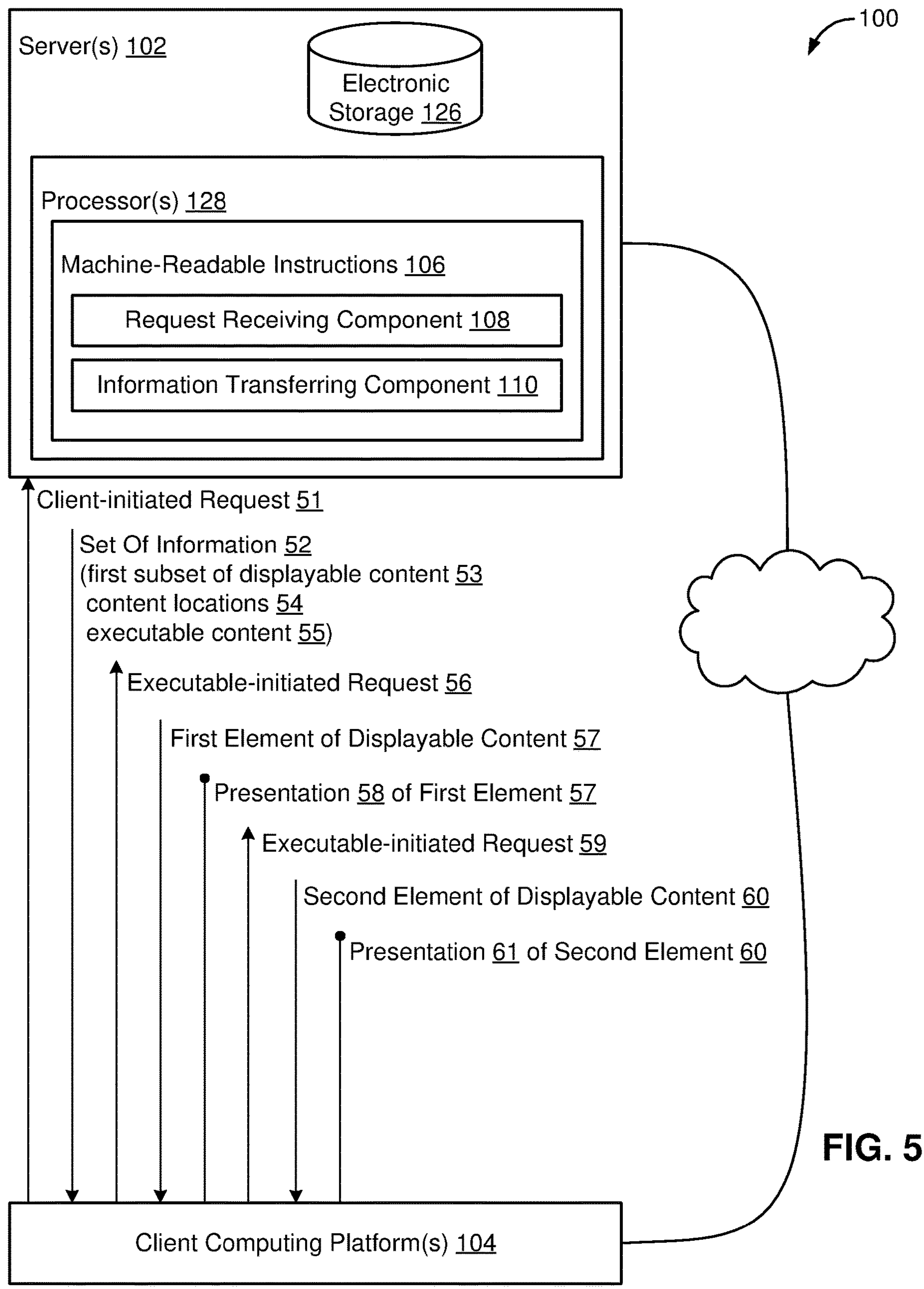
FIG. 5 illustrates a system configured for controlling in which order elements of a set of displayable content are transferred via an online connection, in accordance with one or more implementations.

Request receiving component 108 may be configured to receive a client-initiated request from client computing platform 104. For example, a client-initiated request may be for a webpage, a document, and/or other information. A client-initiated request may be initiated by a user of client computing platform 104. For example, a client-initiated request may be initiated by entry and/or selection performed by the user, e.g., through a user interface. For example, a user may initiate a request by entering a uniform resource locator (URL) or web-address into a browser application. For example, a user may initiate a request by pointing and/or clicking on a link, button, menu, and/or other graphical user interface element. By way of non-limiting example, FIG. 5 illustrates system 100, in which client computing platform 104 transmits a client-initiated request 51 to request receiving component 108.

Referring to FIG. 1, a client computing platform may include one or more of a desktop computer, a laptop computer, a handheld computer, a tablet computing platform, a NetBook, a Smartphone, a smart watch, a smart television, a personal medical device, a mobile computing platform, a gaming console, and/or other computing platforms. Presentations on client computing platform 104 may be accomplished through a browser application. A browser application may be a software application configured to present, display, and/or otherwise render information to a user, including but not limited to webpages.

A webpage may be a text file. A webpage may include displayable content, a document, and/or other information. A webpage may be connected to the World Wide Web and viewable by anyone connected to the internet who has a web browser, according to some implementations. Examples of the webpage may include one or more of a home page and/or other webpages.

Displayable content may include information that can be perceived by users, including but not limited to one or more of text, video, animation, audio, and/or other information, as well as combinations thereof. A set of displayable content may be usable to generate a presentation of the webpage on client computing platform 104. In some implementations, a webpage may include elements that define structure and/or location of displayable content. For example, such elements may include, by way of non-limiting example, frames, borders, page sections, screen sections, and/or other elements. In some implementations, one or more elements of displayable content may be grouped together in a subset of displayable content. For example, a subset of displayable content may correspond to one or more elements that define structure and/or location of (part of) a webpage. For example, a webpage may include three frames, for the top, center, and bottom section of a webpage. The first frame may correspond to a first subset of displayable content, the center frame may correspond to a second subset of displayable content, the bottom frame may correspond to a third subset of displayable content, and so forth.

Figure 3:
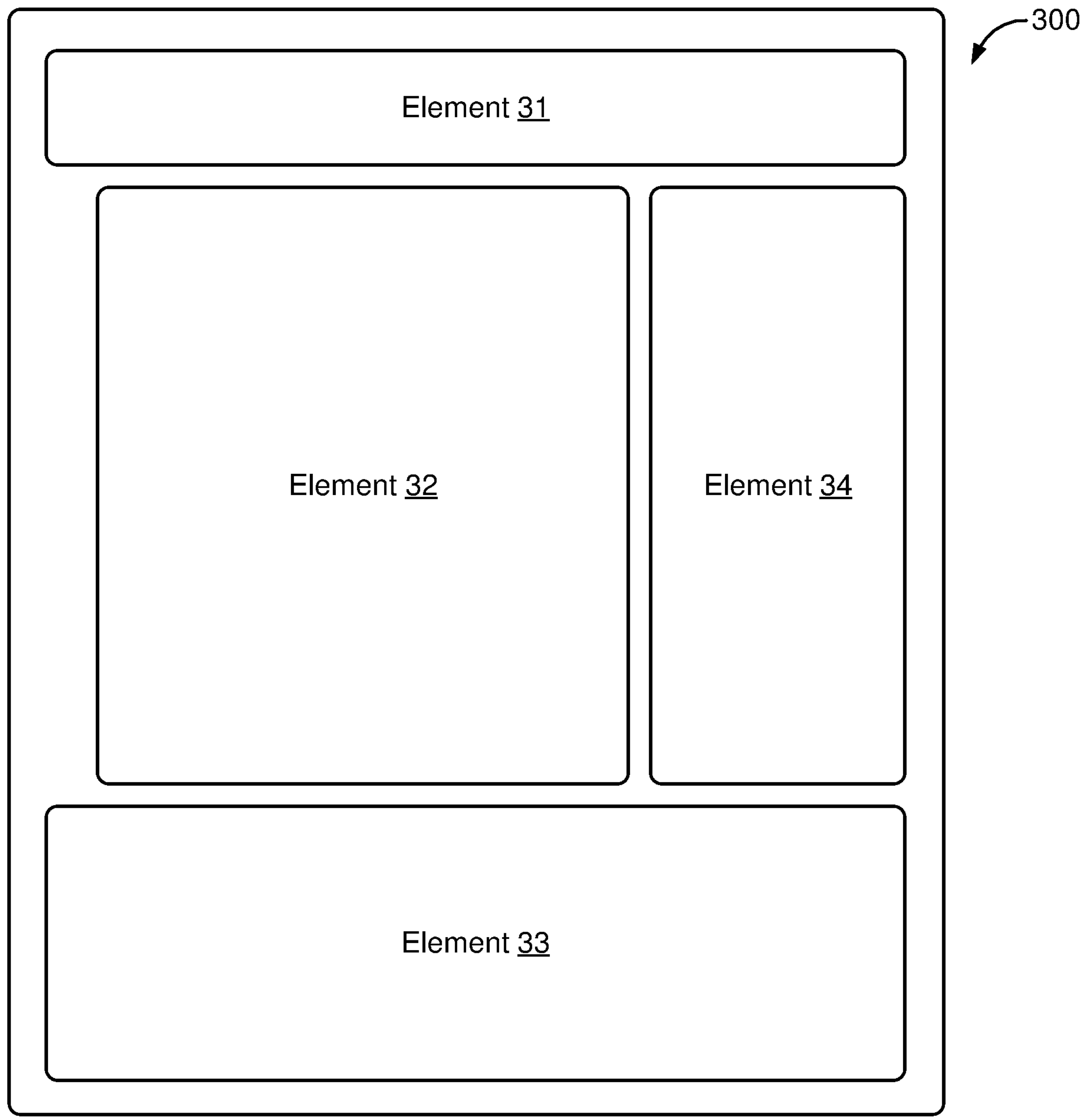
FIGS. 3-4 illustrate exemplary webpages that may be used by a system configured to control in which order elements of the webpage are transferred via an online connection, in accordance with one or more implementations.

By way of non-limiting example, FIG. 3 illustrates an exemplary webpage 300 that may be used by system 100. As depicted, webpage 300 may include various elements of displayable content, including but not limited to element 31, element 32, element 33, element 34, and/or other elements. In a first example scenario, element 32 may include the displayable content having the highest priority among the elements of webpage 300 to be presented to a user, e.g., with regard to interactivity and/or responsiveness. Upon receiving a client-initiated request from a particular client computing platform for webpage 300, a system and/or server hosting webpage 300 may transfer a particular set of information to the particular client computing platform. The particular set of information may include element 32, a particular ordered set of three content locations, and particular executable content. In some implementations, the particular ordered set of content locations may be integrated and/or otherwise embedded in the particular executable content. In some implementations, the particular ordered set may be organized as an array of information. In some implementations, the array may be ordered by virtue of its index. For example, the first element in the array may correspond to a higher priority level than the second element in the array, and so forth. Upon receiving the particular set of information, the particular client computing platform may be configured to present element 32 to its user. Subsequently, the particular client computing platform may be configured to execute the particular executable content. Execution of the particular executable content may cause the particular client computing platform to transmit a first executable-initiated request for a first transfer of one or more elements of displayable content (e.g., element 34), the first executable-initiated request including a first content location from the particular ordered set of content locations. For example, the first content location may identify a location of element 34. Upon receipt of element 34, element 34 may be appended to element 32 for presentation. Subsequently, continued execution of the particular executable content may cause the particular client computing platform to transmit a second executable-initiated request for a second transfer of one or more elements of displayable content (e.g., element 31), the second executable-initiated request including a second content location from the particular ordered set of content locations. For example, the second content location may identify a location of element 31. Upon receipt of element 31, element 31 may be appended to element 32 and element 34 for presentation. Subsequently, continued execution of the particular executable content may cause the particular client computing platform to transmit a third executable-initiated request for a third transfer of one or more elements of displayable content (e.g., element 33), the third executable-initiated request including a third content location from the particular ordered set of content locations. For example, the third content location may identify a location of element 33. Upon receipt of element 33, element 33 may be appended to element 32, element 34, and element 31 for presentation.

In a second example scenario, element 33 may include the displayable content having the highest priority among the elements of webpage 300 to be presented to the user, e.g., with regard to interactivity and/or responsiveness. Upon receiving a client-initiated request from a particular client computing platform for webpage 300, a system and/or server hosting webpage 300 may transfer a particular set of information to the particular client computing platform. The particular set of information may include element 33, a particular content location, and particular executable content. Upon receiving the particular set of information, the particular client computing platform may be configured to present element 33 to its user. Subsequently, the particular client computing platform may be configured to execute the particular executable content.

Execution of the particular executable content may cause the particular client computing platform to transmit a first executable-initiated request for a first transfer of one or more elements of displayable content (e.g., elements 31, 32, and 34, or a set of elements in the same frame, group, region, area, or portion of the webpage). For example, the particular content location may identify a location of elements 31, 32, and 34. Upon receipt of elements 31, 32, and 34, these elements may be appended to element 33 for presentation.

In some implementations, a client-initiated request may be received at a network location. For example, a network location may correspond to a webpage. In some implementations, the network location where the client-initiated request is received may be defined by a uniform resource locator (URL), a uniform resource identifier (URI), a uniform resource name (URN), and/or by another type of location information. For example, the uniform resource locator may be an address. For example, the uniform resource locator may include the address of a web page and/or other document on the world wide web, according to some implementations.

Information transferring component 110 may be configured to transfer, responsive to receipt of the client-initiated request, a set of information to client computing platform 104. The set of information may include one or more of a (sub)set of displayable content, a set of one or more content locations, executable content, and/or other information. The set of displayable content may include one or more of a first subset, a second subset, a third subset, and/or other subsets of displayable content. The first subset of displayable content may be usable to generate the presentation of at least part of the webpage on the client computing platform. By way of non-limiting example, FIG. 5 illustrates system 100, in which information transferring component 110 transmits a set of information 52 to client computing platform 104. The set of information 52 may include a first subset of displayable content 53, one or more content locations 54, and executable content 55.

Referring to FIG. 1, a set of content locations may include a first content location, a second content location, and/or other content locations. The set may be an ordered set. The set may include one or more of a first content location, a second content location. and/or other content locations. Individual ones of the ordered set may identify locations of elements of a set of displayable content, e.g., as included in a webpage. Individual ones of an ordered set of content locations may identify locations of elements of the set of displayable content and/or locations of other information. Locations of displayable content may include network locations, filenames, file-paths, links, and/or other information that may be used to locate an element of displayable content. A first content location may identify a first location of a first element of the set of displayable content. A second content location may identify a second location of a second element of the set of displayable content, and so forth.

Referring to FIG. 1, client computing platform 104 may be configured to receive the set of information. For example, a browser application on client computing platform 104 may be configured to receive the set of information. Client computing platform 104 may be configured to effectuate a presentation of one or more elements of displayable content to the user. For example, a browser application on client computing platform 104 may be configured to present one or more elements of displayable content to the user.

The set of information may include executable content configured to be executed by client computing platform 104. Client computing platform 104 may be configured to execute executable content. For example, a browser application on client computing platform 104 may be configured to execute the executable content. Executing the executable content may include transmitting, from client computing platform 104, one or more executable-initiated requests for one or more transfers of elements of displayable content. An executable-initiated request may be initiated by the executable content. A first executable-initiated request may include a first content location. A second executable-initiated request may include a second content location, and so forth. In some implementations, the executable content may be configured to loop through the set of content locations until the set is exhausted, and for individual ones of the content locations transmit an individual executable-initiated request for a transfer of displayable content, and, subsequent to receipt of the displayable content, present and/or append the displayable content to previously presented displayable content on the client computing platform.

By way of non-limiting example, FIG. 5 illustrates system 100, in which client computing platform 104 transmits an executable-initiated request 56 to server 102 and/or request receiving component 108. Executable-initiated request 56 may have been initiated by executable content 55. In response to executable-initiated request 56, information transferring component 110 may transfer a first element of displayable content 57 to client computing platform 104.

Referring to FIG. 1, executing the executable content may further include effectuating appending one or more elements of displayable content to one or more other elements and/or sets of displayable content for presentation on client computing platform 104 to the user. As used here, the term "appending" may refer to a combination of a new element (of displayable content) with one or more other elements (of displayable content), even if not every previously presented element of displayable content continued to be presented and/or perceivable to a user. For example, a browser application on client computing platform 104 may be configured to append one or more elements of displayable content. By way of non-limiting example, FIG. 5 illustrates system 100, in which client computing platform 104 presents first element of displayable content 57 on client computing platform 104, e.g., by appending first element of displayable content 57 to first subset of displayable content 53 as part of a presentation 58. Client computing platform 104 may transmit executable-initiated request 59 to server 102 and/or request receiving component 108. Executable-initiated request 59 may have been initiated by executable content 55. In response to executable-initiated request 59, information transferring component 110 may transfer second element of displayable content 60 to client computing platform 104. Client computing platform 104 may present second element of displayable content 60 on client computing platform 104, e.g., by appending second element of displayable content 60 to one or both of first subset of displayable content 53 and/or first element of displayable content 57 as part of a presentation 61.

Figure 4:
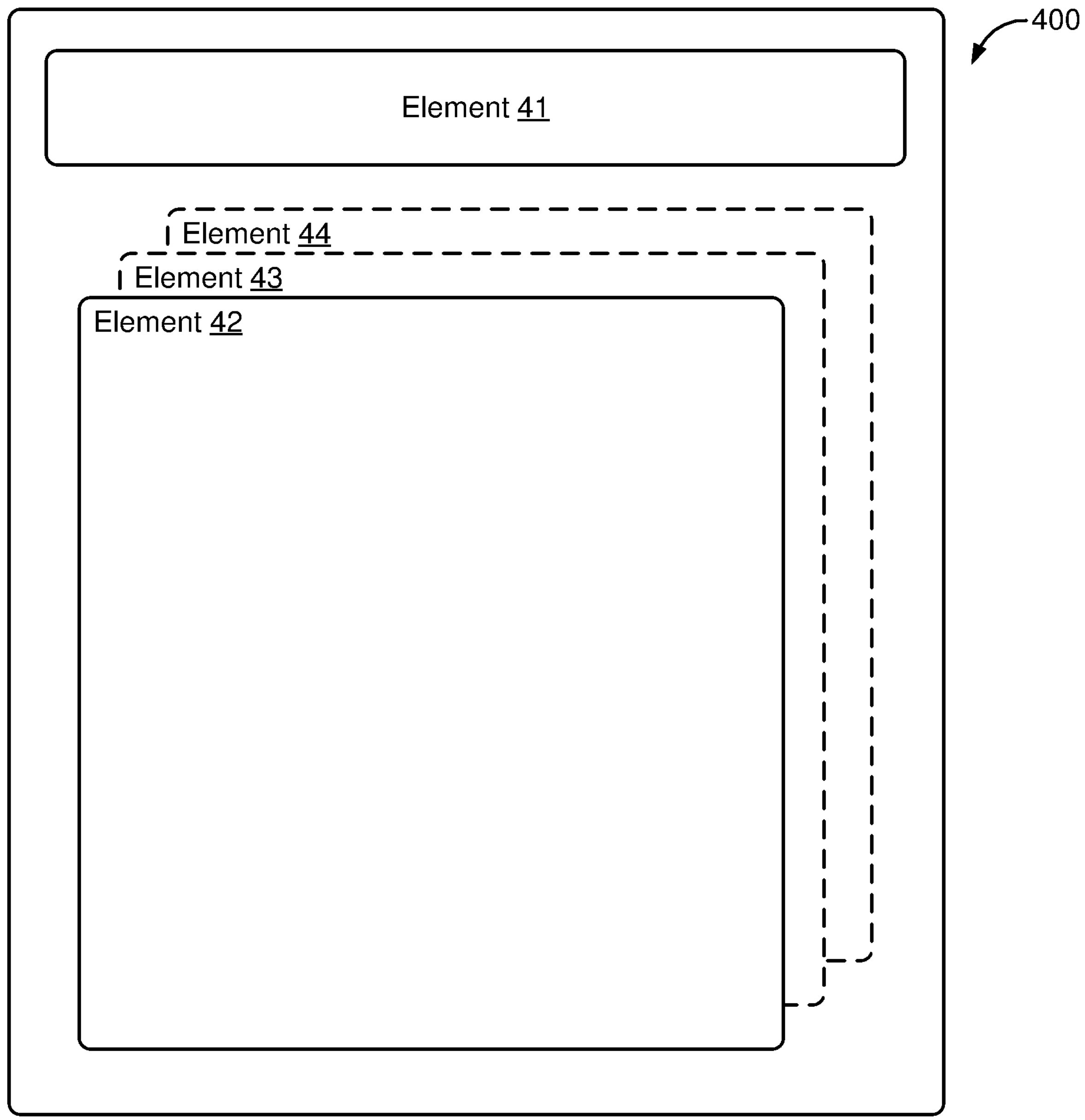

By way of non-limiting example, FIG. 4 illustrates an exemplary webpage 400 that may be used by system 100. As depicted, webpage 300 may include various elements of displayable content, including but not limited to element 41, element 42, element 43, element 44, and/or other elements. In a first example scenario, element 41 may include the displayable content having the highest priority among the elements of webpage 400 to be presented to a user, e.g., with regard to interactivity and/or responsiveness. Upon receiving a client-initiated request from a particular client computing platform for webpage 400, a system and/or server hosting webpage 400 may transfer a particular set of information to the particular client computing platform. The particular set of information may include element 41, a particular ordered set of three or more content locations, and particular executable content. In some implementations, the particular ordered set of content locations may be integrated and/or otherwise embedded in the particular executable content. Upon receiving the particular set of information, the particular client computing platform may be configured to present element 41 to its user. Subsequently, the particular client computing platform may be configured to execute the particular executable content. Execution of the particular executable content may cause the particular client computing platform to transmit a first executable-initiated request for a first transfer of one or more elements of displayable content (e.g., element 42), the first executable-initiated request including a first content location from the particular ordered set of content locations. For example, the first content location may identify a location of element 42. Upon receipt of element 42, element 42 may be appended to element 41 for presentation. Subsequently, continued execution of the particular executable content may cause the particular client computing platform to transmit a second executable-initiated request for a second transfer of one or more elements of displayable content (e.g., element 43), the second executable-initiated request including a second content location from the particular ordered set of content locations. For example, the second content location may identify a location of element 43. Upon receipt of element 43, element 43 may be appended to element 41 and/or element 42 for presentation. As depicted for webpage 400, presentation of element 43 may (at least in part) obscure the user's view of element 42. Alternatively, element 43 may replace element 42. Subsequently, continued execution of the particular executable content may cause the particular client computing platform to transmit a third executable-initiated request for a third transfer of one or more elements of displayable content (e.g., element 44), the third executable-initiated request including a third content location from the particular ordered set of content locations. For example, the third content location may identify a location of element 44. Upon receipt of element 44, element 44 may be appended to element 41, element 42, and/or element 43 for presentation. As depicted for webpage 400, presentation of element 44 may (at least in part) obscure the user's view of element 43 and/or 42. Alternatively, element 44 may replace one or both of element 43 and/or element 42.

Referring to FIG. 1, executing the executable content may further include making a determination whether the set of displayable content includes one or more links to additional content which may be presented to the user, e.g., responsive to receipt of an additional client-initiated request. For example, a webpage may include one or more hyperlinks to additional content which may be retrieved and presented after a user clicks on one or more of the links. Client computing platform 104 may be configured to, responsive to a determination regarding one or more links to additional content, retrieve and/or present the additional content. For example, a browser application on client computing platform 104 may be configured to retrieve and/or present additional content.

In some implementations, individual ones of the ordered set of one or more content locations may be associated with individual priority levels. In some implementations, individual priority levels may correspond to a level of priority that controls in which order different elements (e.g., of the set of displayable content) are downloaded and/or otherwise transferred via an online connection. In some implementations, individual priority levels may correspond to a level of priority that controls in which order different elements (e.g., of the set of displayable content) should become interactive for a user and/or otherwise should become responsive to user input. In some implementations, individual priority levels may correspond to a level of priority that controls in which order different elements (e.g., of the set of displayable content) should be presented to a user. In some implementations, priority levels may be numerical values.

In some implementations, executing the executable content may be initiated and/or accomplished subsequent to the transfer of one or more elements of displayable content. For example, elements that are transferred prior to execution of the executable content may have higher priority than elements that are retrieved due to the execution of the executable content.

In some implementations, the browser application may have a default configuration. In some implementations, the browser application may be a standard browser application. As used herein, a default configuration refers to a browser application that is configured and able to perform certain functionality without requiring additional, specific, customized, and/or otherwise client-specific executable content to be installed and/or otherwise added to the browser application. As used herein, a standard browser application is configured and able to perform certain functionality including receiving user input, initiating a request for a webpage, receiving content responsive to such a request, presenting and/or appending received content, executing executable content, and/or other functionality. As used herein, a browser having a default configuration is assumed to be configured and able to perform certain functionality including receiving user input, initiating a request for a webpage, receiving content responsive to such a request, presenting and/or appending received content, executing executable content, and/or other functionality. For example, by default, execution of JavaScript code is supported by browser applications.

In some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, and/or other components. Processor(s) 128 may be configured to execute components 108, 110, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108 and 110 are illustrated in FIG. 1 as being implemented within a single processing unit, in implementations in which processor(s) 128 includes multiple processing units, one or more of components 108 and/or 110 may be implemented remotely from the other components. The description of the functionality provided by the different components 108 and/or 110 described below is for illustrative purposes, and is not intended to be limiting, as any of components 108 and/or 110 may provide more or less functionality than is described. For example, one or more of components 108 and/or 110 may be eliminated, and some or all of its functionality may be provided by other ones of components 108 and/or 110. As another example, processor(s) 128 may be configured to execute one or more additional components that may perform some or all of the functionality attributed below to one of components 108 and/or 110.

Figure 2:
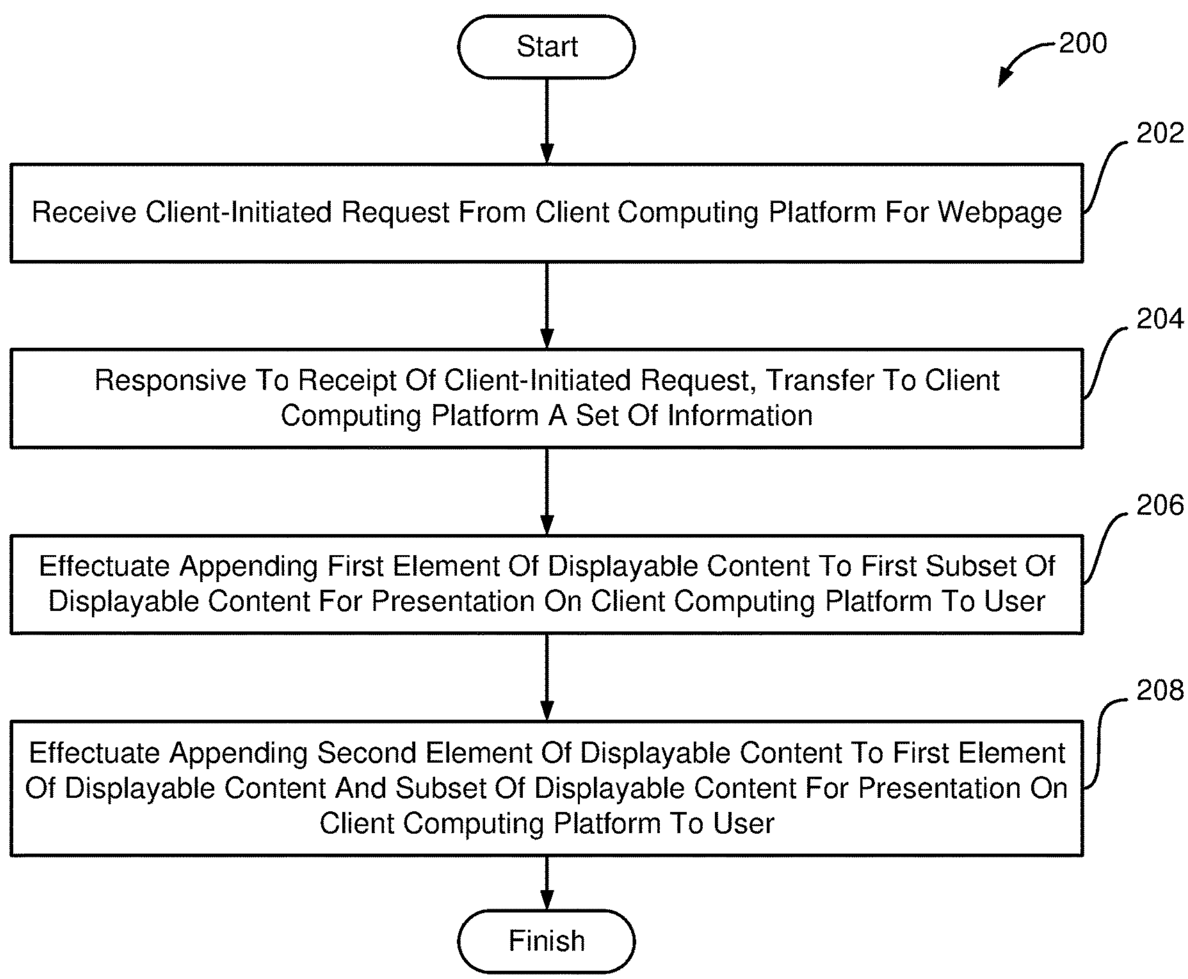
FIG. 2 illustrates a method for controlling in which order elements of a set of displayable content are transferred via an online connection, in accordance with one or more implementations.

FIG. 2 illustrates a method 200 for controlling in which order elements of a set of displayable content are transferred via an online connection, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving a client-initiated request from a client computing platform for a webpage. The webpage may include the set of displayable content. The set of displayable content may be usable to generate a presentation of the webpage on the client computing platform. The client-initiated request may be received at a network location corresponding to the webpage. The client-initiated request may be initiated by a user of the client computing platform. Operation 202 may be performed by one or more hardware processors configured by machine-readable instructions including a component that is the same as or similar to request receiving component 108, in accordance with one or more implementations.

An operation 204 may include, responsive to receipt of the client-initiated request, transferring to the client computing platform a set of information. The set of information may include a first subset of displayable content. The first subset may be usable to generate a presentation of the webpage on the client computing platform. The set of information may include an ordered set of one or more content locations that identify locations of elements of the set of displayable content. The elements may include a first and a second element. The set of information may include executable content configured to be executed by the client computing platform. Operation 204 may be performed by one or more hardware processors configured by machine-readable instructions including a component that is the same as or similar to information transferring component 110, in accordance with one or more implementations.

An operation 206 may include effectuating appending the first element of displayable content to the first subset of displayable content for presentation on the client computing platform to the user. Operation 206 may be performed by a client computing platform that is the same as or similar to client computing platform 104, in accordance with one or more implementations.

An operation 208 may include effectuating appending the second element of displayable content to the first element of displayable content and the first subset of displayable content for presentation on the client computing platform to the user. Operation 208 may be performed by a client computing platform that is the same as or similar to client computing platform 104, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to control in which order elements of a set of displayable content are transferred via an online connection to client computing platforms, the system comprising:

electronic storage comprising non-transitory storage media, wherein the electronic storage is configured to store a set of information electronically, wherein the set of information includes:

(i) a first subset of displayable content, wherein the first subset is a subset of the set of displayable content, (ii) an ordered set of one or more content locations including a first content location, a second content location, and a third content location, wherein the ordered set implies an order of priority in which different elements of displayable content are to be transferred to the client computing platforms, wherein the first content location is associated with a higher level of priority for transfer than the second content location, wherein the second content location is associated with a higher level of priority for transfer than the third content location, wherein the first, second, and third content locations identify different locations of the different elements of displayable content, wherein the different elements of displayable content are part of the set of displayable content, and (iii) executable content configured to be executed by the client computing platforms through default browser applications using default configurations of the default browser applications; and one or more physical processors configured via machine-readable instructions to:

receive a client-initiated request from a first client computing platform for a webpage, wherein the webpage includes the set of displayable content, wherein the set of displayable content is usable to generate a presentation of the webpage on the first client computing platform, wherein the client-initiated request is received at a network location corresponding to the webpage, and wherein the client-initiated request is initiated by a user of the first client computing platform;

responsive to receipt of the client-initiated request from the first client computing platform, transfer to the client computing platform, by the one or more physical processors, the first subset of displayable content, the ordered set of one or more content locations, and the executable content, wherein the first subset of displayable content is configured to be presented by the first client computing platform to the user, wherein the executable content is configured to, upon execution by the first client computing platform:

(a) transmit, from the first client computing platform, a first executable-initiated request for a first transfer, to the first client computing platform, of a first element of the displayable content, wherein the first executable-initiated request is in accordance with the order of priority for transfer that is implied by the ordered set, wherein the first executable-initiated request is initiated by the executable content, wherein the first executable-initiated request includes the first content location selected, according to the order of priority of transfer, from the ordered set of content locations, (b) responsive to receipt by the first client computing platform of the first element of displayable content, effectuate appending the first element of displayable content to the first subset of displayable content for presentation on the first client computing platform to the user, (c) subsequent to transmission by the first client computing platform of the first executable-initiated request, transmit, from the first client computing platform, a second executable-initiated request for a second transfer to the first client computing platform, of a second element of the displayable content, wherein the second executable-initiated request is in accordance with the order of priority for transfer that is implied by the ordered set, wherein the second executable-initiated request is initiated by the executable content, wherein the second executable-initiated request includes the second content location selected, according to the order of priority of transfer, from the ordered set of content locations, wherein the second content location is selected since the first content location has already been included in the previously-transmitted first executable-initiated request, (d) responsive to receipt by the first client computing platform of the second element of displayable content, effectuate appending the second element of displayable content to the first element of displayable content and the first subset of displayable content for presentation on the first client computing platform to the user, (e) subsequent to transmission by the first client computing platform of the second executable-initiated request, transmit, from the first client computing platform, a third executable-initiated request for a third transfer, to the first client computing platform, of a third element of the displayable content, wherein the second executable-initiated request is in accordance with the order of priority for transfer that is implied by the ordered set, wherein the third executable-initiated request is initiated by the executable content, wherein the third executable-initiated request includes the third content location selected, according to the order of priority of transfer, from the ordered set of content locations, wherein the third content location is selected since the first and second content locations have already been included in the previously-transmitted first and second executable-initiated requests, and (f) responsive to receipt by the first client computing platform of the third element of displayable content, effectuate appending the third element of displayable content to the first and second elements of displayable content and the first subset of displayable content for presentation on the first client computing platform to the user;

receive, from the first client computing platform, the first executable-initiated request for the first transfer of the first element of the displayable content, wherein the first executable-initiated request includes the first content location;

responsive to receiving the first executable-initiated request, retrieve the first element of the displayable content based on the first content location;

responsive to retrieving the first element of the displayable content, transmit the first element of displayable content to the first client computing device;

subsequent to receiving the first executable-initiated request, receive, from the first client computing platform, the second executable-initiated request for the second transfer of the second element of the displayable content, wherein the second executable-initiated request includes the second content location;

responsive to receiving the second executable-initiated request, retrieve the second element of the displayable content based on the second content location;

responsive to retrieving the second element of the displayable content, transmit the second element of displayable content to the first client computing device;

subsequent to receiving the second executable-initiated request, receive, from the first client computing platform, the third executable-initiated request for the third transfer of the third element of the displayable content, wherein the third executable-initiated request includes the third content location;

responsive to receiving the third executable-initiated request, retrieve the third element of the displayable content based on the third content location; and responsive to retrieving the third element of the displayable content, transmit the third element of displayable content to the first client computing device.

2. The system of claim 1, wherein the executable content is further configured, upon execution by the first client computing platform, to loop through the ordered set of content locations until the ordered set is exhausted, wherein individual content locations in the ordered set of content locations correspond to individual executable-initiated requests for individual transfers of individual elements of the displayable content such that the individual executable-initiated requests include the individual content locations in the ordered set of content locations.

3. The system of claim 1, wherein the executable content is further configured such that effectuating the appending of the second element of displayable content to the first element of displayable content includes obscuring at least part of the first element of displayable content by the presentation of the second element of displayable content to the user.

4. The system of claim 1, wherein executing the executable content is accomplished subsequent to the transfer of the first subset of displayable content.

5. The system of claim 1, wherein the executable content is further configured such that effectuating the appending of the third element of displayable content to the first and second elements element of displayable content includes replacing one or both of the first and second elements of displayable content from the presentation to the user.

6. The system of claim 1, wherein the online connection is established using hypertext transfer protocol.

7. The system of claim 1, wherein the network location where the client-initiated request is received is defined by at least one of a uniform resource locator and a uniform resource identifier.

8. The system of claim 1, wherein the executable content includes JavaScript code.

9. The system of claim 1, wherein presentations on the client computing platform are accomplished through a browser application, wherein the browser application has a default configuration.

10. The system of claim 1, wherein the presentation of the webpage is accomplished through a default browser application on the client computing platform.

11. The system of claim 1, wherein the one or more hardware processors are further configured by machine-readable instructions to:

receive, by the client computing platform, the set of information;

effectuate, by the client computing platform, a presentation of the first subset of displayable content to the user of the client computing platform;

execute, by the client computing platform, the executable content.

12. The system of claim 1, wherein executing the executable content further includes making a determination whether the set of displayable content includes one or more links to additional content which may be presented to the user responsive to receipt of an additional client-initiated request, wherein the additional client-initiated request is initiated by the user;

wherein the one or more hardware processors are further configured by machine-readable instructions to responsive to the determination regarding the one or more links, retrieve the additional content;

wherein the one or more hardware processors are further configured by machine-readable instructions to responsive to receipt of the additional client-initiated request, effectuate presentation of the retrieved additional content to the user.

13. The system of claim 1, wherein the presentation of the webpage is accomplished through a mobile application on the client computing platform.

14. A method for controlling in which order elements of a set of displayable content are transferred via an online connection to client computing platforms, the method comprising:

receiving a client-initiated request from a first client computing platform for a webpage, wherein the webpage includes the set of displayable content, wherein the set of displayable content is usable to generate a presentation of the webpage on the first client computing platform, wherein the client-initiated request is received at a network location corresponding to the webpage, and wherein the client-initiated request is initiated by a user of the first client computing platform; and responsive to receipt of the client-initiated request, transferring to the first client computing platform a set of information;

wherein the set of information includes a first subset of displayable content, wherein the first subset is usable to generate the presentation of the webpage on the first client computing platform;

wherein the set of information includes an ordered set of one or more content locations including a first content location, a second content location, and a third content location, wherein the ordered set implies an order of priority in which different elements of displayable content are to be transferred to the client computing platforms, wherein the first content location is associated with a higher level of priority for transfer than the second content location, wherein the second content location is associated with a higher level of priority for transfer than the third content location, wherein the first, second, and third content locations identify different locations of the different elements of displayable content, wherein the different elements of displayable content are part of the set of displayable content, wherein individual ones of the ordered set of content locations identify locations of elements of the set of displayable content, wherein the first content location identifies a first location of a first element of the set of displayable content, wherein the second content location identifies a second location of a second element of the set of displayable content, and wherein the third content location identifies a third location of a third element of the set of displayable content;

wherein the set of information includes executable content configured to be executed by the client computing platforms through default browser applications using default configurations of the default browser applications;

wherein executing the executable content includes transmitting, from the first client computing platform, a first executable-initiated request for a first transfer, to the first client computing platform, of a first element of the displayable content, wherein the first executable-initiated request is in accordance with the order of priority for transfer that is implied by the ordered set, wherein the first executable-initiated request is initiated by the executable content, wherein the first executable-initiated request includes the first content location selected, according to the order of priority of transfer, from the ordered set of content locations; and wherein executing the executable content includes responsive to receipt by the first client computing platform of the first element of displayable content, effectuating appending the first element of displayable content to the first subset of displayable content for presentation on the first client computing platform to the user;

wherein executing the executable content includes subsequent to transmission by the first client computing platform of the first executable-initiated request, transmitting, from the first client computing platform, a second executable-initiated request for a second transfer to the first client computing platform, of a second element of the displayable content, wherein the second executable-initiated request is in accordance with the order of priority for transfer that is implied by the ordered set, wherein the second executable-initiated request is initiated by the executable content, wherein the second executable-initiated request includes the second content location selected, according to the order of priority of transfer, from the ordered set of content locations, wherein the second content location is selected since the first content location has already been included in the previously-transmitted first executable-initiated request;

wherein executing the executable content includes responsive to receipt by the first client computing platform of the second element of displayable content, effectuating appending the second element of displayable content to the first element of displayable content and the subset of displayable content for presentation on the first client computing platform to the user;

wherein executing the executable content includes subsequent to transmission by the first client computing platform of the second executable-initiated request, transmitting, from the first client computing platform, a third executable-initiated request for a third transfer, to the first client computing platform, of a third element of the displayable content, wherein the second executable-initiated request is in accordance with the order of priority for transfer that is implied by the ordered set, wherein the third executable-initiated request is initiated by the executable content, wherein the third executable-initiated request includes the third content location selected, according to the order of priority of transfer, from the ordered set of content locations, wherein the third content location is selected since the first and second content locations have already been included in the previously-transmitted first and second executable-initiated requests;

wherein executing the executable content includes, responsive to receipt by the first client computing platform of the third element of displayable content, effectuating appending the third element of displayable content to the first and second elements of displayable content and the first subset of displayable content for presentation on the first client computing platform to the user;

receiving, from the first client computing platform, the first executable-initiated request for the first transfer of the first element of the displayable content, wherein the first executable-initiated request includes the first content location;

responsive to receiving the first executable-initiated request, retrieving the first element of the displayable content based on the first content location;

responsive to retrieving the first element of the displayable content, transmitting the first element of displayable content to the first client computing device;

subsequent to receiving the first executable-initiated request, receiving, from the first client computing platform, the second executable-initiated request for the second transfer of the second element of the displayable content, wherein the second executable-initiated request includes the second content location;

responsive to receiving the second executable-initiated request, retrieving the second element of the displayable content based on the second content location;

responsive to retrieving the second element of the displayable content, transmitting the second element of displayable content to the first client computing device;

subsequent to receiving the second executable-initiated request, receiving, from the first client computing platform, the third executable-initiated request for the third transfer of the third element of the displayable content, wherein the third executable-initiated request includes the third content location;

responsive to receiving the third executable-initiated request, retrieving the third element of the displayable content based on the third content location; and responsive to retrieving the third element of the displayable content, transmitting the third element of displayable content to the first client computing device.

15. The method of claim 14, wherein the executable content, upon execution by the first client computing platform, loops through the ordered set of content locations until the ordered set is exhausted, wherein individual content locations in the ordered set of content locations correspond to individual executable-initiated requests for individual transfers of individual elements of the displayable content such that the individual executable-initiated requests include the individual content locations in the ordered set of content locations.

16. The method of claim 14, wherein effectuating the appending of the second element of displayable content to the first element of displayable content includes obscuring at least part of the first element of displayable content by the presentation of the second element of displayable content to the user.

17. The method of claim 14, wherein effectuating the appending of the third element of displayable content to the first and second elements element of displayable content includes replacing one or both of the first and second elements of displayable content from the presentation to the user.

18. The method of claim 14, wherein the network location where the client-initiated request is received is defined by a uniform resource locator.

19. The method of claim 14, wherein executing the executable content further includes making a determination whether the set of displayable content includes one or more links to additional content which may be presented to the user responsive to receipt of an additional client-initiated request, wherein the additional client-initiated request is initiated by the user;

responsive to the determination regarding the one or more links, retrieving the additional content;

responsive to receipt of the additional client-initiated request, effectuating presentation of the retrieved additional content to the user.

20. The method of claim 14, wherein the presentation of the webpage is accomplished through a mobile application on the client computing platform.

21. A non-transitory computer-readable storage medium having instructions embodied thereon, the instructions being executable by one or more processors to perform a method for controlling in which order elements of a set of displayable content are transferred via an online connection, the method comprising:

receiving a client-initiated request from a client computing platform for a webpage, wherein the webpage includes the set of displayable content, wherein the set of displayable content is usable to generate a presentation of the webpage on the client computing platform, wherein the client-initiated request is received at a network location corresponding to the webpage, and wherein the client-initiated request is initiated by a user of the client computing platform; and responsive to receipt of the client-initiated request, transferring to the client computing platform a set of information;

wherein the set of information includes a first subset of displayable content, wherein the first subset is usable to generate the presentation of the webpage on the client computing platform;

wherein the set of information includes an ordered set of one or more content locations including a first content location and, a second content location, and a third content location, wherein the ordered set implies an order of priority in which different elements of displayable content are to be transferred to the client computing platforms, wherein the first content location is associated with a higher level of priority for transfer than the second content location, wherein the second content location is associated with a higher level of priority for transfer than the third content location, wherein the first, second, and third content locations identify different locations of the different elements of displayable content, wherein the different elements of displayable content are part of the set of displayable content, wherein individual ones of the ordered set of content locations identify locations of elements of the set of displayable content, wherein the first content location identifies a first location of a first element of the set of displayable content, wherein the second content location identifies a second location of a second element of the set of displayable content, and wherein the third content location identifies a third location of a third element of the set of displayable content;

wherein the set of information includes executable content configured to be executed by the client computing platform;

wherein executing the executable content includes transmitting, from the client computing platform, a first executable-initiated request for a first transfer, to the client computing platform, of the first element of the displayable content, wherein the first executable-initiated request is in accordance with the order of priority for transfer that is implied by the ordered set, wherein the first executable-initiated request is initiated by the executable content, wherein the first executable-initiated request includes the first content location selected, according to the order of priority of transfer, from the ordered set of content locations; and wherein executing the executable content includes, responsive to receipt by the client computing platform of the first element of displayable content, effectuating appending the first element of displayable content to the first subset of displayable content for presentation on the client computing platform to the user;

wherein executing the executable content includes subsequent to transmission by the client computing platform of the first executable-initiated request, transmitting, from the client computing platform, a second executable-initiated request for a second transfer, to the client computing platform, of the second element of the displayable content, wherein the second executable-initiated request is in accordance with the order of priority for transfer that is implied by the ordered set, wherein the second executable-initiated request is initiated by the executable content, wherein the second executable-initiated request includes the second content location selected, according to the order of priority of transfer, from the ordered set of content locations, wherein the second content location is selected since the first content location has already been included in the previously-transmitted first executable-initiated request;

wherein executing the executable content includes responsive to receipt by the client computing platform of the second element of displayable content, effectuating appending the second element of displayable content to the first element of displayable content and the subset of displayable content for presentation on the client computing platform to the user;

wherein executing the executable content includes subsequent to transmission by the first client computing platform of the second executable-initiated request, transmitting, from the first client computing platform, a third executable-initiated request for a third transfer, to the first client computing platform, of a third element of the displayable content, wherein the second executable-initiated request is in accordance with the order of priority for transfer that is implied by the ordered set, wherein the third executable-initiated request is initiated by the executable content, wherein the third executable-initiated request includes the third content location selected, according to the order of priority of transfer, from the ordered set of content locations, wherein the third content location is selected since the first and second content locations have already been included in the previously-transmitted first and second executable-initiated requests;

wherein executing the executable content includes, responsive to receipt by the first client computing platform of the third element of displayable content, effectuating appending the third element of displayable content to the first and second elements of displayable content and the first subset of displayable content for presentation on the first client computing platform to the user;

receiving, from the first client computing platform, the first executable-initiated request for the first transfer of the first element of the displayable content, wherein the first executable-initiated request includes the first content location;

responsive to receiving the first executable-initiated request, retrieving the first element of the displayable content based on the first content location;

responsive to retrieving the first element of the displayable content, transmitting the first element of displayable content to the first client computing device;

subsequent to receiving the first executable-initiated request, receiving, from the first client computing platform, the second executable-initiated request for the second transfer of the second element of the displayable content, wherein the second executable-initiated request includes the second content location;

responsive to receiving the second executable-initiated request, retrieving the second element of the displayable content based on the second content location;

responsive to retrieving the second element of the displayable content, transmitting the second element of displayable content to the first client computing device;

subsequent to receiving the second executable-initiated request, receiving, from the first client computing platform, the third executable-initiated request for the third transfer of the third element of the displayable content, wherein the third executable-initiated request includes the third content location;

responsive to receiving the third executable-initiated request, retrieving the third element of the displayable content based on the third content location; and responsive to retrieving the third element of the displayable content, transmitting the third element of displayable content to the first client computing device.

* * * * *